United States Patent [19]

Okada

[11] 3,960,038
[45] June 1, 1976

[54] FABRIC-MARKING APPARATUS

[76] Inventor: Ichiro Okada, 7-1, 1-chome, Ookayama, Meguro, Tokyo, Japan

[22] Filed: Oct. 3, 1975

[21] Appl. No.: 619,380

[30] Foreign Application Priority Data

Oct. 8, 1974 Japan.............................. 49-115936

[52] U.S. Cl. ................................................. 81/9.22
[51] Int. Cl.² ........................................... B43K 5/00
[58] Field of Search .............. 81/9.22; 401/198, 199

[56] References Cited
UNITED STATES PATENTS
3,722,328   3/1973   Lange .................................. 81/9.22
FOREIGN PATENTS OR APPLICATIONS
803,469   4/1951   Germany .............................. 81/9.22

*Primary Examiner*—Al Lawrence Smith
*Assistant Examiner*—Roscoe V. Parker, Jr.
*Attorney, Agent, or Firm*—Bacon & Thomas

[57] ABSTRACT

A fabric-marking apparatus, wherein the upper end portion of a syringe-like or tubular needle for piercing superposed fabric pieces contains an ink pump to which a vertically disposed ink tank is connected; an elastic valve member is fitted in a liquid-tight state between the lower end portion of the cylindrical ink pump and the bottom section of the ink tank; when a plunger concentrically received in said cylindrical ink pump is drawn out therefrom by the descent of the tubular needle, then the elastic valve member allows marking ink to flow from the tank into the cylindrical ink pump; and when the plunger advances into the cylindrical ink pump by the rise of the tubular needle, then a fine aperture formed in the elastic valve member is opened to discharge marking ink from the cylindrical ink pump into the tubular needle.

2 Claims, 7 Drawing Figures

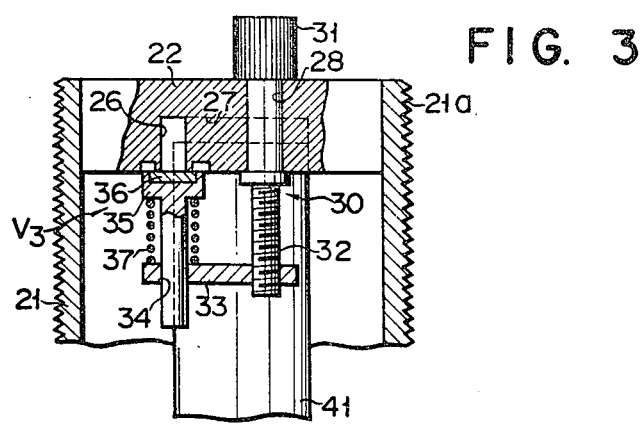
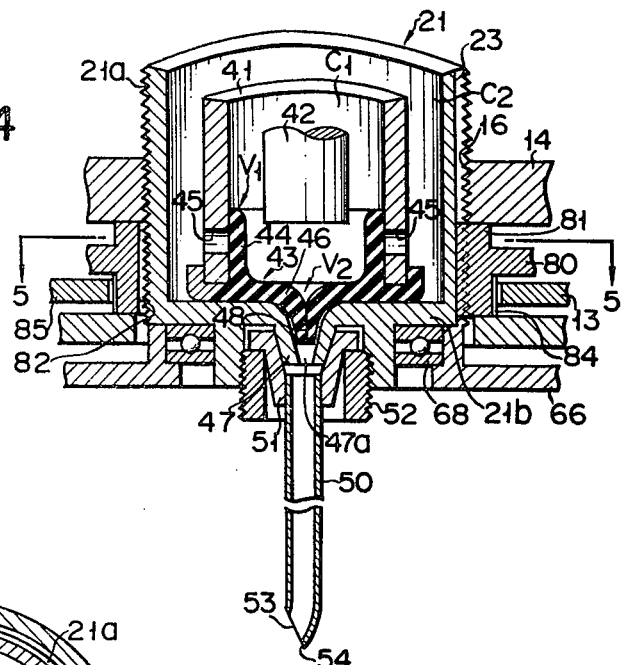
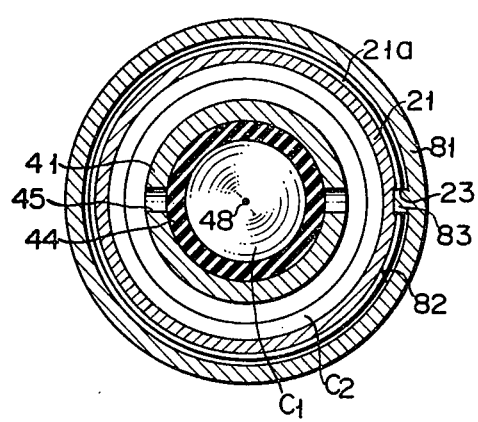

FABRIC-MARKING APPARATUS

BACKGROUND OF THE INVENTION

This invention relates to a fabric-marking apparatus and more particularly to a fabric-marking apparatus which is characterized by passing a marking needle vertically through horizontally superposed fabric pieces at a prescribed point and impressing an ink mark on the same spot of all the superposed fabric pieces by one reciprocating movement of said marking needle.

Where pieces of clothing having the same dimensions are manufactured in large quantities, said pieces are horizontally superposed and cut in the same pattern. In this case, the above-mentioned marking apparatus is applied in marking spots being sewn on the suits such as pocket-fitting spots and button-fitting spots clearly to indicate their positions.

One of the marking processes adopted in the past consisted in passing a heated fine metal wire through superposed fabric pieces and marking them by scorching. Another process was to pass a thread-carrying needle through the spots on the superposed fabric pieces which were to be marked, remove the needle with the thread left fastened to the fabric pieces and taking them off one by one by cutting up the thread so as to cause the cut up portions thereof to remain on each piece.

However, the former conventional marking process had the drawbacks that the noticeable thermal cutting of fibers occured in coarse weave fabric such as knittings with the resultant raveling of woven portions, and a fine metal wire had to be heated frequently, leading to low operating efficiency. The latter prior art making process was accompanied with the shortcomings that a sewn marking thread was likely to come off, once it was loosened out of place, difficulties were presented in reconfirming the exact marked spot, and operating efficiency also decreased as in the former marking process.

Recently, therefore, other marking processes have been proposed which mark required spots of sewing by depositing small ink dots thereon. One of these recently proposed processes consists in connecting an ink tank to the upper end of an elongate needle and letting marking ink flow along the peripheral surface of a solid needle while it is passed through superposed fabric pieces or, in the case the needle is a hollow tubular type, conducting marking ink therethrough to discharge it from the forward end opening of the needle, thereby impressing an ink mark on all the superposed fabric pieces at the same time.

However, any of the recently proposed ink-marking processes had the disadvantages, for example, that ink was ejected in an nonuniform quantity during one reciprocating movement of the needle, ink pigment settled in the ink tank, failing to provide a desired distinct mark, and marking ink in the ink tank was insufficiently shut off from the atmosphere.

SUMMARY OF THE INVENTION

It is accordingly the object of this invention to provide a reliably and quickly operative and inexpensive fabric-marking apparatus of simple construction which enables marking ink to be safely stored in an ink tank and ejected in a uniform quantity, thereby always attaining distinct marking.

With a fabric-marking apparatus according to this invention, a special ink pump is received in an ink tank, and a hollow tubular needle is connected to the ink tank. The ink pump is provided with an elastic valve member which is so designed as not to supply any ink to the hollow tubular needle during its downward stroke in which it falls with the ink tank to pierce the superposed fabric pieces but, during the upward stroke of the needle, to deliver ink continuously at a uniform flow rate to said hollow tubular needle and discharge marking ink from the forward end of said needle, thereby depositing marking ink on each of the superposed fabric pieces.

The fabric-marking apparatus of this invention enables marking ink smoothly to circulate through the ink tank, thereby realizing the uniform ejecting marking ink. Since, as mentioned above, marking ink is not drawn out during the downward stroke of the hollow cylindrical needle, the subject fabric-marking apparatus offers the advantages that the hollow tubular needle is not prevented from advancing by the unduly high viscosity of marking ink which might otherwise occur, thereby suppressing the possibility of fabric fiber being damaged by the obstructed movement of said needle or said needle itself being broken. The present fabric-marking apparatus is further provided with an ink ejection-controlling valve, which prevents marking ink from flowing out of the hollow tubular needle in an excess amount, thereby enabling an ink mark to be always impressed in a proper size on each of the superposed fabric pieces.

BRIEF DESCRIPTION OF THE DRAWING

FIG. 3 is a fractional enlarged illustration of a pressure-controlling valve included in the fabric-marking apparatus of FIG. 1;

FIG. 4 is a fractional enlarged illustration showing the suction and discharge valve sections of the fabric-marking apparatus of FIG. 1;

FIG. 5 is a sectional view on line 5—5 of FIG. 4;

DETAILED DESCRIPTION OF THE PREFERRED EMBODIMENTS

Figure 1:
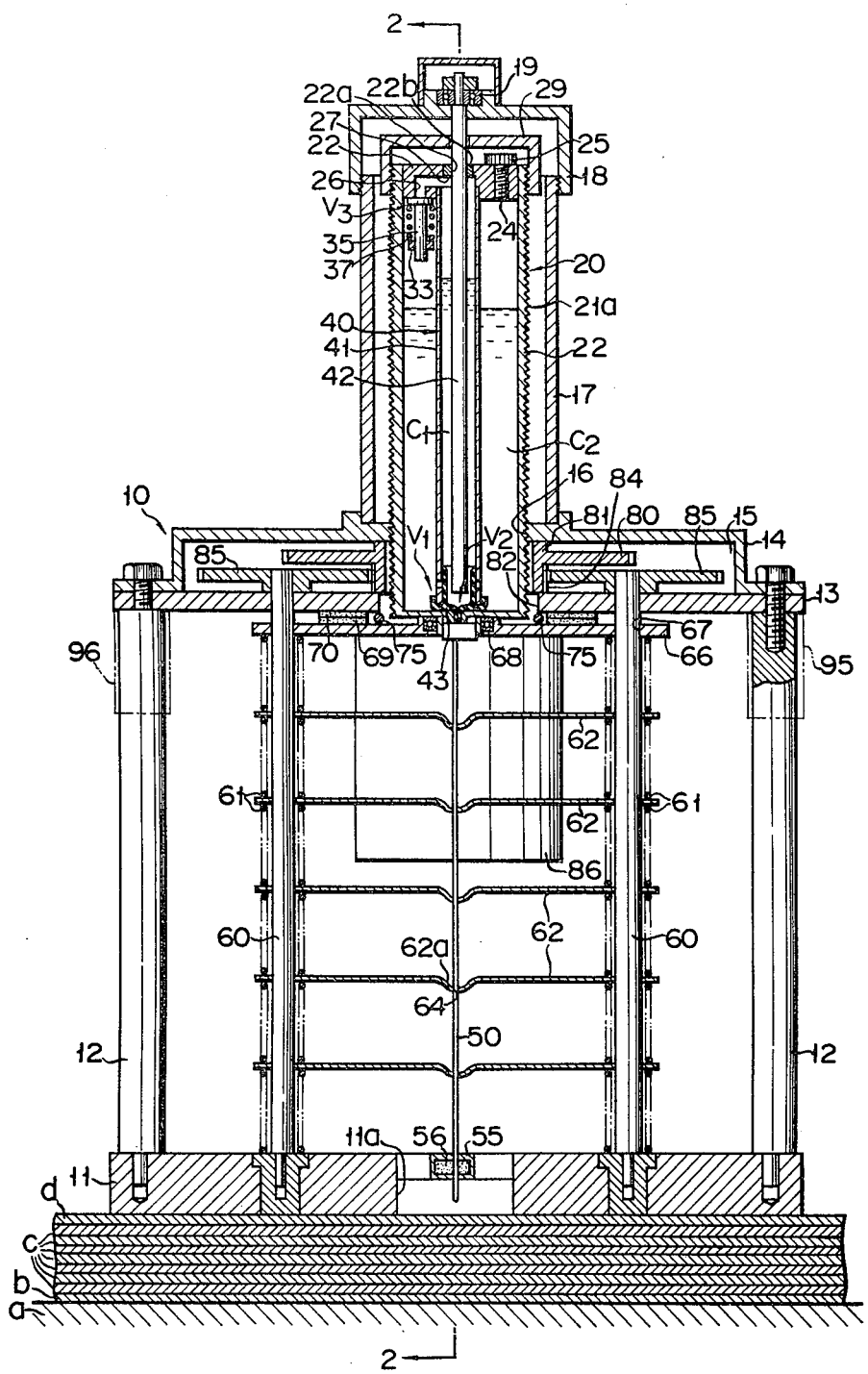
FIG. 1 is a longitudinal sectional view of a fabric-marking apparatus according to this invention.
Figure 2:
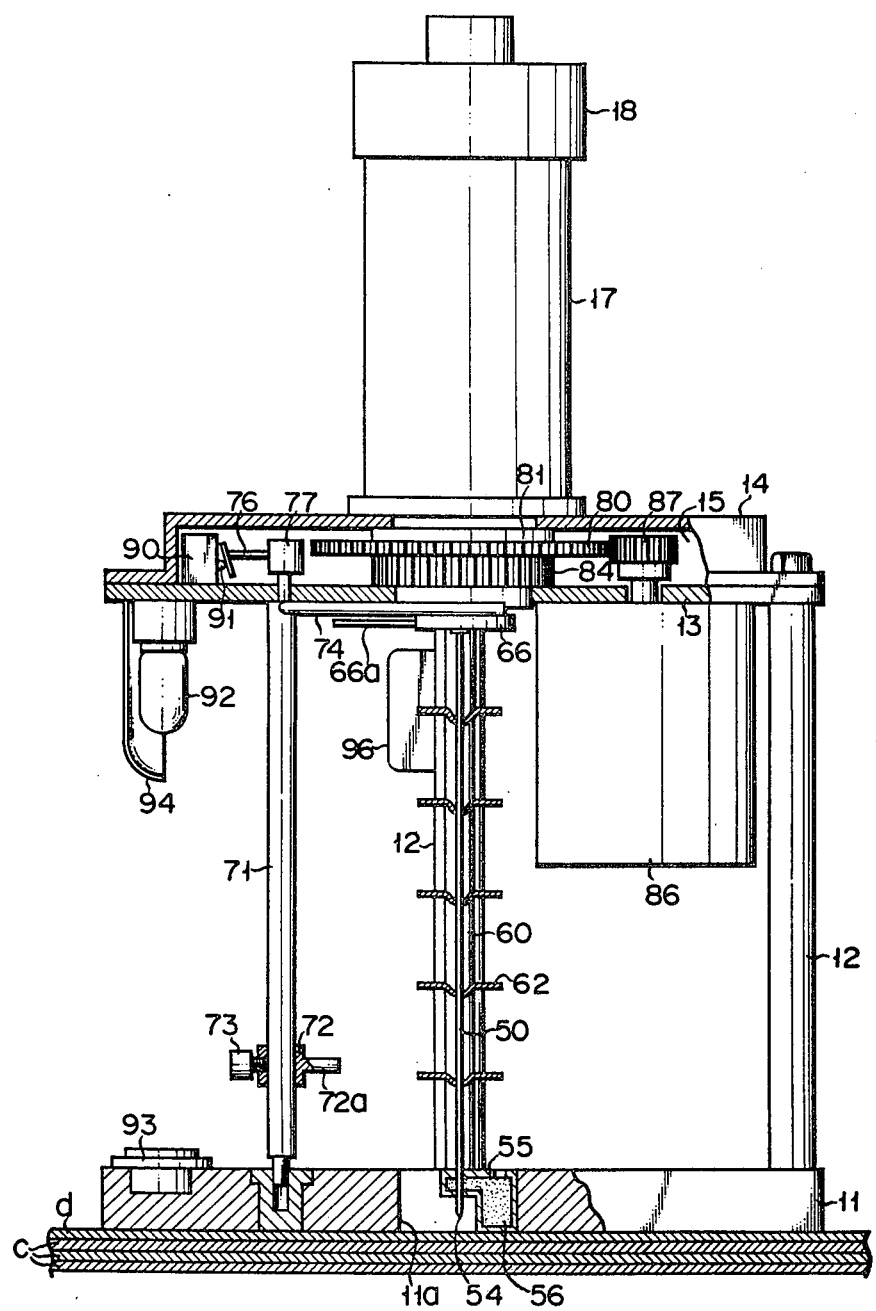
FIG. 2 is a side view on line 2—2, partly broken away, of the fabric-marking apparatus of FIG. 1.

Referring to FIGS. 1 and 2, a plurality of superposed fabric pieces c are placed on a horizontal base plate a with a cushioning material b having a proper thickness interposed between said fabric pieces c and base plate a. A sheet of paper pattern d indicating the spots being marked is mounted on the uppermost fabric piece. The cushioning material b should preferably consist of felt fitted, for example, on a thin sheet of aluminum.

With the fabric-marking apparatus of this invention, a frame 10 is provided with a base block 11, which in turn is set on the superposed fabric pieces c with the paper pattern d interposed between said base block 11 and the superposed fabric pieces c. The base block 11 is formed into a disc shape and provided with a smooth bottom wall so as to easily slide over the paper pattern d. A plurality of support rods 12 are vertically erected along th peripheral edge of the upper wall of the block 11. Bolted to the upper ends of said support rods 12 are a support plate 13 and cap member 14. A gear box 15 is defined between said support plate 13 and cap member 14. The cap member 14 is bored with a screw hole 16 at the center. A cylindrical casing 17 is fixed on the upper wall of the cap member 14 around the peripheral edge of the screw hole 16 so as to project vertically. A cap 18 is detachably engaged with the upper end portion of the cylindrical casing 17 by means of screw threads, and provided with a bearing 19 at the center. A cylindrical link tank 20 is vertically received in the cylindrical casing 17. Threads 21a are formed on the peripheral wall of the body 21 of said cylindrical ink tank 20 along the substantially entire length thereof. Said threaded portion 21a is fitted into the screw hole 16. A lengthwise extending keyway 23 is cut out in the peripheral wall of the body 21 of the cylindrical ink tank 20, as clearly shown in FIG. 4. The upper end opening of said body 21 is fitted with an end block 22 in airtightness. A threaded plug 25 is detachably fitted in airtightness into a threaded ink supply passage 24 bored in the block 22. The end block 22 is provided, as shown in enlargement in FIG. 3, with a vertical passage 26 open at the bottom and a horizontal passage 27, one end of which communicates with said vertical passage 26 and the other end of which communicates with the upper opening of the later described cylinder 41. A cap member 29 threaded inside is detachably engaged with the upper end portion of the ink tank body 21 threaded on the outside so as to enclose the end block 22.

The end block 22 is bored, as shown in FIG. 3, with a penetrating hole 28 into which there is rotatably inserted a pressure-controlling rod 30 provided with a knob 31 at the upper end and threads 32 at the lower end. A threaded connection board 33 engaging said threaded portion 32 at one end is bored with a penetrating hole 34 at the other end. A valve member 35 is slidably inserted into said penetrating hole 34. The upper end of said valve member 35 is fitted with a pliable valve seat plate 36. Stretched between the connection board 33 and valve seat plate 36 is a coil spring 37, whose biasing force normally causes the valve seat plate 36 to be pressed against the periphery of the opening of the vertical passage 26.

The reciprocating cylinder 41 of an ink pump 40 is concentrically received in the upright cylindrical ink tank body 21, and has the upper end fixed to the end block 22 in airtightness. The inner chamber of the cylinder 41 (hereinafter referred to as "a pump chamber $C_1$") communicates at the upper end with the horizontal passage 27. A plunger 42 is received in the vertically extending pump chamber $C_1$ concentrically with the cylinder 41. The upper end portion of the plunger 42 penetrates a through hole 22a formed at the center of the end block 22 in airtightness by means of a sealing device 22b constituted by an O-ring, further passes through the cap member 29 and finally is rotatably supported on the cap 18 through the bearing 19 so as to be prevented from falling. The lower end portion of the plunger 42 extends to the neighborhood of the lower end of the cylinder 41.

The lower end opening of the cylinder 41 is fitted, as clearly shown in FIG. 4, in a liquid-tight state with a specifically shaped elastic valve member 43 made of a pliable material such as rubber. The bottom wall of said valve member 43 is pressed against the inner wall of the bottom section 21b of the ink tank body 21 in a liquid-tight state. The valve member 43 has an integral upright cylindrical portion 44 abutting against the inner peripheral wall of the cylinder 41 in a liquid-tight state. The side wall of the lower end portion of the cylinder 41 is bored with a pair of radially extending penetrating holes 45, which are normally elastically closed by said upright cylindrical portion 44. The number of said penetrating holes 45 is not limited to two. The elastic valve member 43 further has a downward extending projection 46 (FIG. 4) integrally formed at the center. This projection 46 extends to an ink discharge portion 47 projectively formed at the bottom section 21b of the ink tank body 21 so as to extend downward like the above-mentioned projection 46. This projection 46 is bored at the center with a fine penetrating aperture 48 normally kept closed by the elasticity of said projection 46. The ink discharge portion 47 has an opening 47a formed at the lower end so as to face said fine penetrating aperture 48. The interior space (hereinafter referred to as "a tank chamber $C_2$") of the body 21 of the ink tank 20 is filled, as described later, with a proper quantity of marking ink through an inlet port 24 (FIG. 1). When the cylinder 41 is brought down with the ink body 21, the plunger 42 is lifted correspondingly, causing the pressure in the pump chamber $C_1$ to drop. As the result, the upright cylindrical portion 44 of the elastic valve member 43 is elastically depressed inward from the outside by the pressure of the tank chamber $C_2$, causing the ink held in the tank chamber $C_2$ to run into the pump chamber $C_1$ through a plurality of penetrating holes 45.

Conversely when the cylinder 41 is lifted and the plunger 42 is brought down accordingly, then the pressure in the cylinder is increased, causing the cylindrical portion 44 of the elastic valve member 43 tightly to close the penetrating holes 45 so as to obstruct the influx of marking ink therethrough. Thus the cylindrical portion 44 and penetrating holes 45 jointly constitute the suction valve means $V_1$ of the ink pump 40.

When the plunger 42 falls with the resultant increase in the pressure in the pump chamber $C_1$, then the fine penetrating aperture 48 of the elastic valve member 43 is enlarged to allow marking ink to flow out of the pump chamber $C_1$ through said fine aperture 48. The drawn out ink is forced into the later described elongate tubular needle 50 through the opening 47a. When the plunger 42 rises, the fine aperture 48 is substantially closed to obstruct the efflux of any ink. Namely, the downward extending projection 46 of the elastic valve member 43 constitutes the exhaust valve means of the pump 40.

When the plunger 42 descends to cause the cylinder pressure to rise over a prescribed level, then the valve member 35 is pressed downward against the biasing force of the coil spring 37 to allow the pump chamber $C_1$ to communicate with the tank chamber $C_2$, thereby preventing the pressure in the pump chamber $C_1$ from being excessively elevated. When the plunger 42 is lifted, the valve member 35 closes the opening of the vertical passage 26 by the action of the coil spring 37. Namely, an assembly including the valve member 35 constitutes the pressure-controlling valve means $V_3$ of the pump 40. This pump $V_3$ which defines an upper limit to the pressure in the pump chamber $C_1$ controls an amount of marking ink drawn out of an ink exhaust port 53 slantwise open at the lower end portion of the tubular needle 50. The valve $V_3$ further causes part of the marking ink held in the pump chamber $C_1$ to run back to the tank chamber $C_2$, thereby preventing the pigment contained in the marking ink from being precipitated.

The piercing needle 50 is made of tough material, for example, stainless steel in the form of an elongate narrow tube. This tubular needle 50 is disposed perpendicular to the bottom plane of the base block 11, and detachably fitted into the ink discharge portion 47 in a liquid-tight state by means of a fitting metal part 51 (FIG. 4) fixed to the upper end portion of said needle 50. The tubular needle 50 is tightly fixed in place by a tightening metal part 52 threadedly fitted into the bottom section 21b of the ink tank body 21 so as to be prevented from being loosened off the fixed position by a friction resistance occurring between said needle 50 and the superposed fabric pieces c and any other external force, for example, ink pressure. The tubular needle 50 is chosen to have an outer diameter ranging from 0.4 to 1.0 mm according to the kind of fabric being marked. The ink discharge port 53 of the tubular needle 50 is made elongate in the axial direction thereof. The longitudinal diameter of said elliptic ink discharge port 53 is substantially as long as the thread pitch of the screw hole 16 and screw 21a. The peripheral edge of the ink discharge port 53 is made smooth so as to prevent the tubular needle 50 from damaging the fibers of the superposed fabric pieces c when piercing them while being rotated and also to minimize a frictional resistance occurring between the needle 50 and fabric pieces c. The outermost end portion 54 of the tubular needle 50 is formed into a curved shape having a gentle curvature. The tubular needle 50 is chosen to have such a length as causes said outermost end 54 to be disposed slightly above the paper pattern d when the ink tank 20 takes the uppermost position.

A penetrating hole 11a bored at the center of the base block 11 is fitted with a lubricating oil tank 55, which contains a fibrous material impregnated with lubricating oil, for example, silicone oil. When the tubular needle 50 is lifted through said lubricating oil tank 55, then the lubricating oil is deposited on the peripheral surface of the tubular needle 50.

Fitted to the frame 10 are a pair of guide rods 60 by the base block 11 and a horizontal support plate 13 in perpendicular relationship with the bottom plane of said base block 11, with both upper and lower end portions of said paired guide rods 60 rotatably supported. Each guide rod 60 is wound with a plurality of coil springs 61 each having a prescribed free or inoperative length and relatively weak spring force and vertically extending in the longitudinal direction of said rod 60. The coil spring 61 is preferred to be formed of turns having different diameters and consequently capable of being telescopically inserted into the adjacent ones, that is, all the turns are desired collectively to present, for example, a sandglass shape, as shown in enlargment in FIG. 5. When, therefore, compressed, the coil spring 61 has a smallest possible length. Even when formed, for example, into a conical shape, the coil spring 61 can well serve the purpose.

Figure 6:
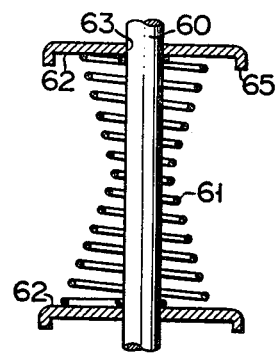
FIG. 6 is a schematic enlarged view of a needle guide plate-supporting coil spring included in the fabric-marking apparatus of FIG. 1, showing the preferred form of said coil spring.

A plurality of needle guide plates 62 made of thin narrow metal sheets are stretched across said paired guide rods 60. A penetrating hole 63 (FIG. 6) is bored near both ends of each needle guide plate 62. The guide rod 60 is loosely inserted into said penetrating hole 63 so as to slide therethrough while being rotated. Both end portions penetrated by the paired guide rods 60 are interposed between the adjacent coil springs 61 wound about said guide rods 60. Namely, one coil spring 61 is fitted between the adjacent needle guide plates 62 at both ends thereof. A pair of coil springs 61 disposed between the adjacent needle guide plates 62 are chosen to have substantially the same free or inoperative length and substantially the same degree of compressibility. Therefore, the needle guide plates 62 are always kept horionztal in parallel relationship. The guide plate 62 is bored at the center with a needle passage hole 64. Said needle passage holes 64 are vertically aligned so as to guide the tubular needle 50 therethrough without buckling. A downward projecting recess 62a (FIG. 1) is formed around the needle passage hole 64, thereby enabling the forward end portion 54 of the tubular needle 50 to be smoothly inserted into the needle passage hole 64 even when said forward end portion 54 is slightly displaced to strike against the inner wall of said recess 62a when passing through said passage hole 64. The peripheral edge of the needle guide plate 62 may be provided with a reinforcement bent portion 65. This arrangement allows the needle guide plate 62 to be made considerably thin. Said guide plate 62 can be easily manufactured by press molding.

A stop plate 66 vertically movable together with the ink tank 20 is bored at both ends, as shown in FIG. 1, with a penetrating hole 67 into which the guide rod 60 is loosely inserted so as to slide therethrough while being rotated. Said stop plate 66 is further provided at the center with a bearing 68 for supporting the bottom section 21b (FIG. 4) of the ink tank body 21 so as to allow it to rotate about the vertical axis of said body 21. The underside of the stop plate 66 abuts against the upper end of the coil spring 61 placed uppermost.

The upper surface of the stop plate 66 is fitted with a plurality of permanent magnets 69, which are so positioned as to face the corresponding permanent magnets 70 fixed to the underside of the horizontal support plate 13. The stop plate 66 is normally held in the uppermost position shown, for example, in FIG. 1, where both groups 69, 70 of permanent magnets are attracted to each other.

An actuating rod 71 has its upper end supported by the horizontal support plate 13 and its lower end supported by the base block 11 so as to move vertically and its outer peripheral surface impressed with axially extending graduations for measuring the thickness of superposed fabric pieces (FIG. 2). An actuating element 72 is movably fitted to the actuating rod 71 so as to be freely set at any desired point thereon by a stop screw 73. The actuating element 72 is provided with a projection 72a, which is intended to force the actuating rod 71 downward, when the top plate 66 falls to cause its arm 66a (FIG. 2) to abut against the projection 72a. The actuating rod 71 is fitted near its upper end with a U- or Y-shaped horizontally extending arm 74, and both end portions 75, 75 (FIG. 1) are interposed between the stop plate 66 and horizontal support plate 13. When, therefore, the ink tank 20 is lifted to its uppermost position and the stop plate 66 also rises to its uppermost position together with said end portions 75, 75, then the actuating rod 71 is pushed to its uppermost position. The upper end portion of the actuating rod 71 which upward penetrates the horizontal support plate 13 is fitted with a second actuating element 77 provided with a finger 76.

A master gear 80 concentrical with the ink tank body 21 is rotatably received in the gear chamber 15. The ink tank body 21 is loosely inserted for vertical movement into an axial hole 82 bored in the boss 81 of the master gear 80. The axial hole 82 has an inward projecting key-like projection 83 (FIG. 5) slidably engaged with the keyway 23 formed in the outer peripheral wall of the ink tank body 21. A gear 84 (FIG. 2) is integrally formed on the outer peripheral wall of the boss 81. A pair of gears 85 (FIG. 1) engaging said gear 84 are fixed to the upper ends of the corresponding guide rods 60.

Figure 7:
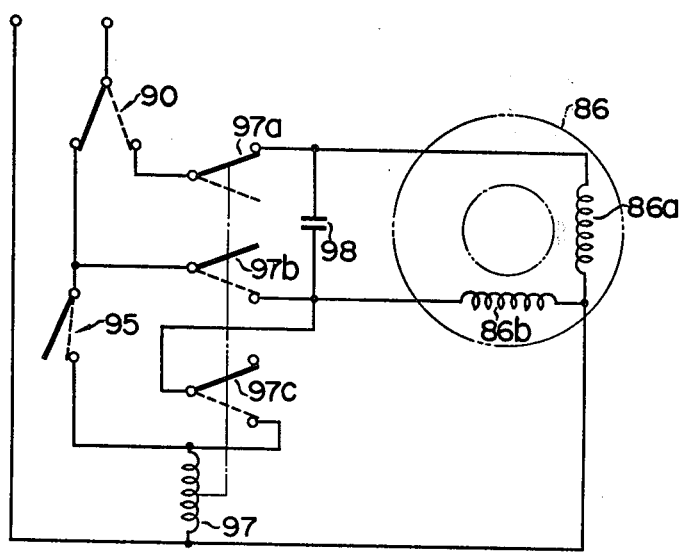
FIG. 7 is an electric circuit diagram for controlling the operation of the fabric-marking apparatus of FIG. 1.

The horizontal support plate 13 is fitted with a reversible electric motor 86 (FIGS. 1, 2 and 7). The drive shaft of said motor 86 is provided as shown in FIG. 2 with a gear 87 engaging the master gear 80.

If necessary, the electric motor 86 may be fitted to the cap member 14.

A changeover microswitch 90 (FIG. 2) is provided with an actuating tongue 91 which is so positioned as to contact the finger 76. When the actuating rod 71 is brought down, the finger 76 touches the tongue 91 to bring the changeover switch 90 into operation causing the electric motor 86 to be rotated reversely.

A lamp 92 is fitted to the underside of the horizontal support plate 13 to illuminate the lower end portion of the tubular needle 50, paper pattern d showing marking spots, graduations on the actuating rod 71 and a level 93 mounted on the base block 11. A light shield 94 is provided near the lamp 92 so as to prevent light from entering an operator's eyes.

Switches 95, 96 indicated in chain lines in FIG. 1 are fitted to the corresponding support rods 12. One of said switches, for example, the unit 95, is intended to start the reversible electric motor 86, and the other unit 96 is used in operating the lamp 92.

With the foregoing embodiment, the reversible electric motor 86 consists of a single phase condenser type and is provided with a control circuit shown in FIG. 7. The parts of FIG. 7 the same as those of FIGS. 1 and 2 are denoted by the same numerals. The solid lines of the switches 90, 95, 97a, 97b, 97c denotes their electrical connection before they are started. The relay coil 97 is connected to a power source through the changeover switch 90 and start switch 95. The junction of a pair of coils 86a, 86b is connected to one of the power source terminals. The other side ends of the coils 86a, 86b are connected to the other power source terminal through the corresponding relay contacts 97a, 97b. The other side ends of the coils 86a, 86b are connected together by a condenser 98. The relay contact 97c is connected in series to the realy contact 97b and in parallel to the start switch 95. These elements 97c, 97b, 95 jointly constitute a selfholding circuit.

There will now be described the operation of the marking apparatus of this invention constructed as described above to mark superposed fabric pieces. The ink tank 20 is closed after being filled with a prescribed amount of marking ink. The power supply terminal is connected to the power source. Marking ink is brought from the tank member $C_2$ into the pump chamber $C_1$ either by vertically moving the plunger 42 fitted to the cap 18 through the cylinder 41 before threadedly engaging the cap 18 with the cylindrical casing 17 or by vertically moving the ink tank 20 through the operation of the start switch 95 after threadedly engaging the cap 18 with the cylindrical casing 17. At this time, the pressure-controlling rod 30 is operated to adjust the pressure of the spring 37 so as to enable a suitable amount of marking ink to be drawn out of the ink discharge port 53 of the tubular needle 50.

The marking apparatus is set, as shown in FIG. 1, on superposed fabric pieces c with the paper pattern d interposed therebetween. The switch 96, for example, is operated to light the lamp 92. The actuating element 72 is placed on a suitable position on the actuating rod 71 while reading graduations thereon so as to prevent the foremost end 54 of the tubular needle 50 from excessively protruding downward from the lowermost one of the superposed fabric pieces c to touch the horizontal base plate a. After the above-mentioned preparatory steps, the support rods 12 are manually so located as to cause the foremost end 54 of the tubular needle 50 to fall on any marking spot indicated on the paper pattern d and then the start switch 95 is closed to excite the relay coil 97, causing the relay contacts 97a, 97b, 97c to be changed over to the broken line positions. As the result, the relay coil 97 is still kept in a selfholding state even when the switch 95 is opened. The electric motor 86 continues to be driven in a prescribed direction with one coil 86a connected in series with the condenser 98. The rotating moment of the electric motor 86 is transmitted to the master gear 80, gears 84, 85 through the gear 87, causing the paired guide rods 60 to commence rotation. Rotation of the master gear 80 leads to the rotation of the ink tank 20 by engagement between the key-like projection 83 of the axial hole 82 bored in the boss 81 of the master gear 80 and the keyway 23 of the ink tank body 21. The ink body 21 is brought downward while being rotated about the vertical axis by threaded engagement between the screw hole 16 and threaded portion 21a. As the result, the cylinder 41 also falls while being rotated. On the other hand, the plunger 42 which is kept at rest by the cap 18 is drawn out of the cylinder 41, causing marking ink to flow from the tank chamber $C_2$ into the pump chamber $C_1$ through the suction valve $V_1$. The plunger 42 rotatably supported by means of the bearing 19 is rotated with the end block, substantially eliminating any rotation friction between the cylinder 22b and plunger 42.

The descent of the ink tank 20 leads to that of the stop plate 66, causing the coil springs 61 wound about the paired guide rods 60 to be simultaneously compressed, and consequently the guide plates 62 to be successively brought downward. During the fall of the guide plates 62, the paired guide rods 60 are continuously rotated by the gear 85, fully minimizing a frictional resistance between the guide plates 62 and stop plate 66 on one hand and the guide rods 60 on the other. Accordingly, the guide plates 62 smoothly descend in parallel relationship at an equal interval. The tubular needle 50 rotatingly falls while being inserted into the penetrating hole of the lubricant tank 55 until the foremost end 54 of the tubular needle 50 pierces the superposed fabric pieces c. The tubular needle 50 which rotatingly pierces the superposed fabric pieces c and whose foremost end 54 is smoothly curved presents very little frictional resistance, and can be smoothly passed downward through the superposed fabric pieces without buckling and damaging the fibers of the fabric pieces. As previously mentioned, marking ink does not run out of the discharge port 53 during the downward stroke of the tubular needle 50, but flows out only during its upward stroke.

When the discharge port 53 of the tubular needle 50 fully passes through the lowermost one of the superposed fabric pieces, then the arm 66a of the stop plate 66 is pressed against the projection 72a to force down the actuating rod 71, whose finger 76 displaces the actuating tongue 91 of the changeover switch 90. Accordingly, the movable contact of said switch 90 has its position changed to that indicated in a broken line in FIG. 7 to cut off the excitation current of the relay coil 97, bringing the relay contacts 97a, 97b, 97c back to their original positions shown in solid lines in FIG. 7. At this time, the condenser 98 is connected in series to the other coil 86b of the electric motor 86, which is now driven in the opposite direction to the previous case, causing all the actuating members to be also reversely operated. As the result, the tubular needle 50 is lifted to mark the superposed fabric pieces c by the ejection of marking ink from the discharge port 53. Namely, the rise of the cylinder 41 pushes the plunger 42 thereinto, causing the marking ink held in the pump chamber $C_1$ to be forcefully carried into the tubular needle 50 through the exhaust valve $V_2$ and drawn out of the discharge port 53 disposed at the lower end of said needle 50. Ejection of marking ink continues during the upward stroke of the cylinder 41. During this time, excess air or marking ink is drawn out into the tank chamber $C_2$ through the pressure-controlling valve $V_3$, keeping the pressure in the pump chamber $C_1$ substantially constant, and consequently allowing marking ink to run out of the discharge port 53 at an almost fixed flow rate. Therefore, marking can be effected reliably in the same pattern on the superposed fabric pieces c successively from the lowermost to the uppermost one.

When the ink tank 20 rises up to its original position, the stop plate 66 is attracted to the horizontal support plate 13 by the magnets 69, 70 to lift the actuating rod 71 through the arm 66a of said stop plate 66, bringing the finger 76 of the second actuating element 77 and the actuating tongue 91 of the changeover switch 90 back to their original positions. As the result, the movable contact of the changeover switch 90 is switched to the solid line position of FIG. 7, causing the electric motor 86 to be shut off from the power source and brought to rest and consequently restoring the marking apparatus to an inoperative state.

As mentioned above, the fabric-marking apparatus of this invention enables a plurality of superposed fabric pieces to be marked uniformly in accurate agreement with required spot of sewing indicated on the paper pattern d. The inventor's experiments show that a 0.7 mm outer diameter tubular needle marked a single spot on 180 fabric pieces superposed to a thickness of 180 mm in 35 seconds in total, that is, carrying out said marking in as short a time as 0.2 second per piece per spot of marking. In contrast, the prior art fabric marking process of passing a thread through superposed fabric pieces at a spot of marking and cutting up the thread in divisions for the respective pieces took 20 seconds to carry out marking per piece per spot of marking. Therefore, the time of marking performed by the marking apparatus of this invention has been prominently decreased substantially to one hundredth part of that consumed by the above-mentioned prior art marking process. Further, with the present fabric-marking apparatus, the tubular needle 50 which has passed downward through, for example, the above-mentioned 180 superposed fabric pieces 180 mm thick is displaced only ±2 mm on the lowermost piece from a prescribed spot of sewing. Such small displacement presents little difficulty in practical purpose. About 0.5 cc of marking ink is drawn out per operation of the ink pump, enabling a distinct mark about 1–2 mm in diameter to be impressed on the front and back sides of each fabric piece. The fabric-marking apparatus of this invention has as light a weight as about 3.5 kg, and allows marking to be carried out easily even by an unskilled worker.

With the fabric-marking apparatus of this invention, an elastic valve member disposed between the lower end of the cylindrical ink pump and the bottom section of the ink tank constitutes the suction and exhaust valves of the ink pump and allows marking ink to run into the pump chamber during the down stroke of the tubular needle and to flow from the pump chamber into the tubular needle only during the upward stroke thereof. Since, therefore, any marking ink is not drawn out of the forward end of the tubular needle during its downward stroke, the tubular needle is not obstructed in passing through superposed fabric pieces by the undesirable ejection of marking ink which might otherwise occur. Marking ink is discharged at a uniform flow rate by a specially designed ink pump used in the fabric-marking apparatus of this invention. Further, this ink pump causes the marking ink held in the ink tank to circulate therethrough, thereby preventing the pigment of marking ink to be precipitated in the ink tank. Further, the pressure in the pump chamber is properly adjusted by the pressure-controlling valve means, enabling marking ink to be discharged in any desired amount. Thus the fabric-marking apparatus of this invention is characterized by the above-mentioned numerous prominent advantages.

What is claimed is:

1. A fabric-marking apparatus having a frame, a cylindrical ink tank vertically supported on the frame and filled with marking ink, drive means for vertically reciprocating the ink tank in the axial direction, and an elongate hollow tubular piercing needle vertically reciprocated with the tank and bored with a lengthwise extending ink passage, characterized in that said apparatus further comprises an end block fitted to the upper end of the tank in airtightness; an elongate cylinder open at both ends, fixed to the end block in airtightness, received concentrically in the tank, and provided in the lower end side wall with communication aperture means for allowing the flow of marking ink between the interior spaces of the cylinder and tank; an elastic valve member provided with an integral cylindrical portion elastically pressed against the lower end inner wall of the cylinder normally to close the communication aperture means and fitted in a liquid-tight state between the lower open end of the cylinder and the bottom section of the tank; fine communication aperture means bored at the center of the elastic valve member, normally closed by its own elastic force, and, where required, designed to conduct marking ink held in the cylinder to the tubular needle through an ink discharge port formed in the bottom section of the tank; and an elongate plunger concentrically extending through the cylinder, the upper end of said plunger being supported on a frame and the lower end thereof penetrating the end block in airtightness, whereby, when the plunger is drawn out of the cylinder at its descent, the resultant decreased pressure in the cylinder causes the cylindrical portion of the elastic valve member to open the communication aperture means, allowing marking ink to flow into the cylinder, and, when the plunger is brought into the cylinder at its rise, the resultant increased pressure in the cylinder causes the fine communication aperture of the elastic valve member to be opened against its elastic force, allowing marking ink to be ejected.

2. The fabric-marking apparatus according to claim 1, which further comprises passages formed in the end block so as to communicate with the upper end opening of the cylinder and open to the interior of the tank; a valve member disposed at those openings of the passages which face the tank; spring means causing the valve member to be elastically pressed against said openings so as to normally close them in airtightness; and manually operative means for controlling the elastic pressure of the spring means.

* * * * *